United States Patent
Lu et al.

(10) Patent No.: US 8,510,228 B2
(45) Date of Patent: Aug. 13, 2013

(54) TRANSFER METHOD OF ELECTRONIC CASH

(75) Inventors: Zhi jun Lu, Shanghai (CN); Shuo He, Shanghai (CN); Hongwen Meng, Shanghai (CN)

(73) Assignee: China Unionpay Co., Ltd., Shanghai (CN)

( * ) Notice: Subject to any disclaimer, the term of this patent is extended or adjusted under 35 U.S.C. 154(b) by 0 days.

(21) Appl. No.: 13/088,326

(22) Filed: Apr. 15, 2011

(65) Prior Publication Data

US 2012/0158594 A1     Jun. 21, 2012

Related U.S. Application Data

(63) Continuation of application No. PCT/CN2009/001044, filed on Sep. 18, 2009.

(30) Foreign Application Priority Data

Oct. 16, 2008    (CN) .............................. 200810201300

(51) Int. Cl.
*G06Q 20/00*     (2012.01)

(52) U.S. Cl.
USPC .................. 705/67; 705/65; 705/64; 705/50; 705/44; 705/16; 705/39; 713/155; 713/156; 713/157; 713/158; 713/159

(58) Field of Classification Search
USPC ........................................................ 705/67
See application file for complete search history.

(56) References Cited

U.S. PATENT DOCUMENTS

| | | | |
|---|---|---|---|
| 2005/0269396 A1* | 12/2005 | Schofield | 235/379 |
| 2009/0198618 A1* | 8/2009 | Chan et al. | 705/66 |

OTHER PUBLICATIONS

Security Matters © 2012. (http://www.mastercard.com/us/wce/PDF/PSI_Magazine_SecurityMatters_US.pdf).*

* cited by examiner

*Primary Examiner* — James A Reagan
(74) *Attorney, Agent, or Firm* — Martine Penilla Group, LLP

(57) ABSTRACT

A card to card transfer method used in the financial system is provided in the present invention, and comprises an initializing step, a transferring step and a transaction confirming step, wherein the initializing step includes the steps of calculating and obtaining the public key certificate and checking the amount of the transaction and so on, and the transferring step includes the steps of performing the transaction and so on. The present invention can achieve the function of transferring the electronic cash between two cards and can prevent the risk of repeatedly transferring the money into the card for transfer-in by using the card for transfer-out and so on.

13 Claims, 6 Drawing Sheets

TRANSFER METHOD OF ELECTRONIC CASH

CLAIM OF PRIORITY

This application claims priority under 35 U.S.C. §§120 and 365(c) as a continuation application of prior International Application PCT/CN2009/001044, which was filed on Sep. 18, 2009, which claims priority to Chinese Patent Application No. 200810201300.0, filed on Oct. 16, 2008. The disclosure of the prior international application and Chinese application are incorporated herein by reference.

FIELD OF THE INVENTION

The present invention relates to the electronic financial field, particularly to the method for transferring certain electronic cash from one card to another card via a terminal or an application program.

BACKGROUND ART

Nowadays, many institutions zealously investigate and explore the application mechanism and business model of IC card in the mobile payment field, and use the application which meets the specification of PBOC electronic wallet in the experiment and research about the mobile payment technique. However, the electronic wallet using the symmetric algorithm constrains the business development in some degree, because of its high complexity in practice.

The electronic wallet specification formulated in 1997 is restricted by a plurality of factors, such as the cost of IC card, the complexity of IC card application support system and so on, thus the symmetry algorithm is used to realize the safety control mechanism. To date, the restriction condition have been solved basically, and the electronic cash specification is set down in time, with the result that new opportunity and foundation for new business brought for solving new technique are provided. The electronic cash specification is designed based on the non-symmetric algorithm, using the newest technique and idea, with adding the card to card transfer function on the basis of the electronic cash, thus it not only can meet the present requirement of the mobile payment technique, but also provide a broader development space for the application of IC card, such as different kinds of special-shaped card.

SUMMARY OF THE INVENTION

The object of the present invention is to provide a transfer method between the cards recording electronic cash.

In order to solve the technical problem, an transfer method of electronic cash is provided by the present invention, comprising the following steps:

a card for transfer-out generates a first digital signature based on the information provided by a card for transfer-in, and the card for transfer-in generates a second digital signature based on the information provided by the card for transfer-out and sends the second digital signature to the card for transfer-out via a terminal;

the card for transfer-out verifies the second digital signature, and executes a transfer-out operation if it is right;

the card for transfer-out generates a first transaction validation code associated with the card for transfer-in and sends the first digital signature and the first transaction validation code to the card for transfer-in via the terminal;

the card for transfer-in verifies the first digital signature, and executes a transfer-in operation if it is right; and the card for transfer-in generates a second transaction validation code associated with the card for transfer-out and sends the second transaction validation code to the card for transfer-out via the terminal, to confirm that the transfer transaction succeeds.

Preferably, in above method, the card for transfer-out generates the first digital signature according to the following manner: the card for transfer-out obtains a public key certificate of the card for transfer-in, and if it is successful, then further determines if the balance in the card for transfer-out meets the requirement of the transfer transaction, and if it meet, then in accordance with a transfer-in party validation list provided by the card for transfer-in, generates the first digital signature using the private key certificate of the card for transfer-out, the transfer-in party validation list comprises the balance of the card for transfer-out and a transfer-in counter.

Preferably, in above method, the card for transfer-in generates the second digital signature according to the following manner: the card for transfer-in obtains a public key certificate of the card for transfer-out, and if it is successful, then further determines if the balance in the card for transfer-in meets the requirement of the transfer transaction, and if it meet, then in accordance with a transfer-out party validation list provided by the card for transfer-out, generates the second digital signature using the private key certificate of the card for transfer-in, the transfer-out party validation list comprises a transfer-out counter.

Preferably, in above method, the private key certificates of the card for transfer-out and the card for transfer-in are stored in the card for transfer-out and the card for transfer-in respectively.

Preferably, in above method, the card for transfer-out and the card for transfer-in verify the second and the first digital signature respectively using the public key certificate of the card for transfer-in and the public key certificate of the card for transfer-out.

Preferably, in above method, the card for transfer-out obtains the public key certificate of the card for transfer-in according to the following manner:

obtaining a card-issuing bank public key certificate of the card for transfer-in based on the CA public key certificate internally stored in the card for transfer-out; and obtaining the public key certificate of the card for transfer-in using the obtained card-issuing bank public key certificate of the card for transfer-in.

Preferably, in above method, the card for transfer-in obtains the public key certificate of the card for transfer-in according to the following manner:

obtaining a card-issuing bank public key certificate of the card for transfer-out based on the CA public key certificate internally stored in card for transfer-in; and obtaining the public key certificate of the card for transfer-out using the obtained card-issuing bank public key certificate of the card for transfer-out.

Preferably, in above method, the card for transfer-out generates the first transaction validation code according to the following manner: generating the first transaction validation code using the symmetric key algorithm based on a value-added digital signature list provided by the card for transfer-in, wherein, the card for transfer-in generates the second transaction validation code according to the following manner: generating the second transaction validation code using the symmetric key algorithm based on a value-reduced digital signature list provided by the card for transfer-out.

Preferably, in above method, the information provided by the card for transfer-in and the card for transfer-out is sent to the card for transfer-out and the card for transfer-in via the terminal Preferably, in above method, the card for transfer-out and the card for transfer-in are IC cards.

Preferably, in above method, the card for transfer-out executes the transfer-out operation according to the following manner:

deducting the transfer money from the balance in the card for transfer-out;

recording the transaction detail in the card for transfer-out; and setting the forbidding transfer-out flag of the card for transfer-out.

Preferably, in above method, the card for transfer-in executes the transfer-in operation according to the following manner:

summing the transfer money and the balance in the card for transfer-in;

recording the transaction detail in the card for transfer-in; and releasing the abnormal transfer-in flag of the card for transfer-in.

Preferably, in above method, further comprises the following steps:

the card for transfer-out receives the second transaction validation code; and the forbidding transfer-out flag of the card for transfer-out is released.

According to the embodiments of the present invention, it can be ensured to finish the transaction only on the condition that the card for transfer-in is true and reliable, and return its digital signature to the transfer-in party validation data, because after card to card transfer initialization is executed by the transfer-out party, the transfer-out party does not return to the validation digital signature for the transfer-in party until the transfer has been executed. If the terminal repeatedly send the data to the transfer-in party, because the digital signature can not be validated, the data returned by the transfer-out party can be used only once, thereby this can prevent that the terminal repeatedly execute transfer-in operation to the card for transfer-in using the card for transfer-out. In addition, the prohibiting transfer-out flag and the abnormal transfer-in flag is set in the card, to avoid the case in which the transfer-out operation has been executed in the card for transfer-out, while the transfer-in operation is not executed in the card for transfer-in.

BRIEF DESCRIPTION OF THE DRAWINGS

In order to make it easy to understand, referring to the attached drawings, one embodiment of the present invention is described by way of non-restrictive examples, wherein.

DETAILED DESCRIPTION OF THE EMBODIMENTS

Generally, the realization of the electronic cash application is presented in the form of card, and it can also be the mobile terminal or the special-shaped card such as key ring, earring, and watch and so on, generally called card. The procedure in which certain small electronic cash is transferred from one card to another card via the terminal or the application between said two cards is defined as card to card transfer. The card to card transfer is can be realized in such a way that the electronic cash card is installed on the mobile phone which have the function of the contactless reader-writer, and it also can be realized by one independent terminal, such as the financial terminal supporting card to card transfer transaction.

Firstly, the terms in the present specification will be explained in the following.

Transfer-out party validation list (OUTADOL): the data object list of the transfer-in party validated by the transfer-out party, including the transfer-out counter.

Transfer-in party validation list (INADOL): the data object list of the transfer-out party validated by the transfer-in party, including the transfer-in counter, balance of the card for transfer-out.

Value-reduced signature list (DECDOL): the data object list signed for the transaction by the transfer-in party when the transfer-out party transfers-out the electronic cash.

Value-added signature list (INCDOL): the data object list signed for the transaction by the transfer-out party when the transfer-in party transfers-in the electronic cash.

Transfer-out identifier: the identifier of the transfer-out transaction

Transfer-in identifier: the identifier of the transfer-in transaction

Forbidding transfer-out flag: the flag for forbidding transfer-out

Abnormal transfer-in flag: the flag of the abnormal transfer-in transaction

Transfer-out counter: the transaction counter set for the transfer-out transaction, which can be read-out.

Transfer-in counter: the transaction counter set for the transfer-in transaction, which can be read-out.

Transfer-in transaction validation code: the validation code for validating the reality of the transfer-in transaction.

Transfer-out transaction validation code: the validation code for validating the reality of the transfer-out transaction.

In the traditional transaction mode, the card-issuing bank certificate is stored in the card, whereas the root CA certificate of the card-issuing bank is stored in the terminal But in the present invention, the card to card transfer transaction occurs between two cards, and the terminal responsible for performing the transaction is not necessarily the financial terminal, thus the CA root certificate formerly stored in the terminal is stored in the card.

The embodiment of the present invention is described by way of the attached drawings in the following.

Figure 1:
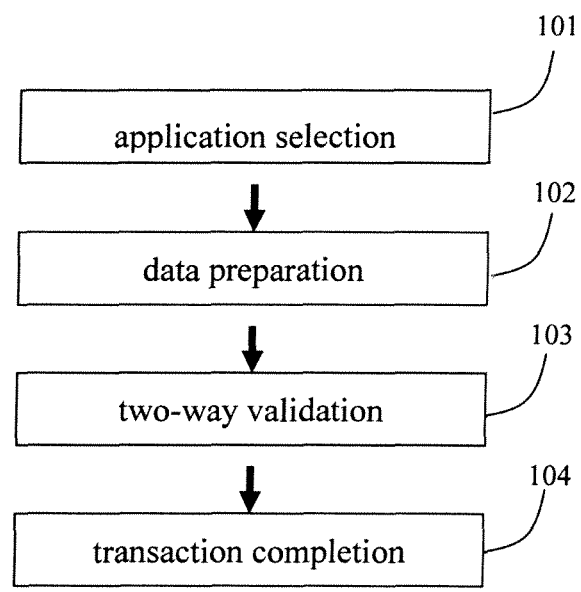
FIG. 1 illustrates the electronic cash transfer flow according to one embodiment of the present invention.

As shown in FIG. 1, the electronic cash transfer transaction includes several processes, i.e. the application selection 101, the data preparation 102, the two-way validation 103 and the transaction completion 104. The detailed description is given in the following.

Application Selection Process

In the process of the application selection, the instructions are sent by the terminal to the card for transfer-out and the card for transfer-in, instructing the card for transfer-out and the card for transfer-in to return the following data: the balance in the card, the flag and the version number supporting the card to card transfer. The terminal determines if both of the two parties in the transaction (i.e. the card for transfer-out and the card for transfer-in) support the function of the card to card transfer or the transfer function of the electronic cash on the basis of the returned data, and records each version number. If both of the two parties in the transaction support the function of the card to card transfer and the version number is compatible, the data preparation process is entered, or else the user will be prompted by the information that the function is not supported.

Data Preparation Process

In the process of the data preparation, the terminal reads the following data from the card for transfer-out and the card for transfer-in: the data exchanged between each other, the card-issuing bank public key certificate of the card for transfer-out and the card for transfer-in, the transfer-in party validation list (INADOL)/the transfer-out party validation list (OUTADOL), the value-added digital signature list (INCDOL)/the value-reduced digital signature list (DECDOL), the transfer-out counter/the transfer-in counter and so on. It should be noted that above listed data types are just illustrated, the other data type also can be used according to different specifications of the dynamic data verification. After receiving these data, the terminal writes the corresponding data of the card for transfer-in into the card for transfer-out, and writes the data of the card for transfer-out into the card for transfer-in.

Two-Way Validation Process

Then, in the Two-way validation process, the card for transfer-out and the card for transfer-in perform dynamic data validation using these data to ensure the credibility, the reality and the safety of the transaction. In the present embodiment, the transferred-out money, the date, the transfer-in party validation list are inputted firstly to the card for transfer-out by the terminal, notifying the card for transfer-out to execute the card initialization transfer-out operation. As response, the card for transfer-out executes the following steps in its interior:

The transfer-in party public key certificate is obtained based on the data acquired from the terminal. The specific acquiring step for example can be: the card for transfer-out acquiring the card-issuing bank public key certificate of the card for transfer-in based on the CA public key certificate internally stored in the card for transfer-out, then acquiring the public key certificate of the card for transfer-in using the acquired card-issuing bank public key certificate of the card for transfer-in.

If the card for transfer-out successfully obtains the public key certificate of the card for transfer-in, then based on the INADOL of the card for transfer-in, the corresponding digital signature data is calculated and stored, or else an error is reported and the transaction is terminated.

On the other hand, the terminal inputs the transferred-in money, the date and the transfer-in party validation list (OUTADOL) to the transfer-in party, notifying the card for transfer-in to execute the initialization transfer-in operation. As response, the card for transfer-in executes the following steps in its interior:

The transfer-out party public key certificate is obtained based on the data acquired from the terminal. The specific obtaining step for example can be: the card for transfer-in obtains the card-issuing bank public key certificate of the card for transfer-out based on the CA public key certificate internally stored in the card for transfer-in, then obtains the public key certificate of the card for transfer-out using the obtained card-issuing bank public key certificate of the card for transfer-out.

If the card for transfer-in successfully obtains the public key certificate of the card for transfer-out, then the corresponding digital signature data is calculated based on OUTADOL of the card for transfer-out and returns the digital signature to the terminal, or else an error is reported and the transaction is terminated.

Subsequently, the terminal sends the transfer-in card's digital signature for OUTADOL and the value-added digital signature list (INCDOL) to the card for transfer-out. As response, the card for transfer-out executes the following steps in its interior:

validating if the digital signature for the OUTADOL calculated by the card for transfer-in is correct, and executing the transfer-out transaction operation if it is right, or else returning the error code and terminating the transaction. The transfer-out transaction operation comprises deducting the transfer-out money from the money, storing the data (such as digital signature and so on) calculated by the card for transfer-in into the transaction detail file in the card for transfer-out. Then, the card for transfer-out calculates the first transaction validation code based on the INCDOL, and returns back the digital signature for the INADOL and the first transaction validation code to the terminal.

After receiving the digital signature for the INADOL and the first transaction validation code sent by the card for transfer-out, the terminal sends the digital signature for the INADOL, the Value-reduced digital signature list (DECDOL) and the first transaction validation code to the card for transfer-in. As response, the card for transfer-in executes the following steps in its interior:

validating if the digital signature calculated by the card for transfer-out is correct, and executing the transfer-in transaction operation if it is right, or else returning the error code and terminating the transaction. The transfer-in transaction operation comprises adding the balance (adding according to the transfer-in money), storing the data (such as transaction validating code and so on) of the transfer-out party into the transaction detail file. Then, the card for transfer-in calculates the second transaction validation code based on the value-reduced digital signature list (DECDOL), and returns the second transaction validation code to the terminal.

Transaction Completion Process

In the last transaction completion process, the terminal sends the second transaction validation code returned by the card for transfer-in to the card for transfer-out, notifying the card for transfer-out that the transfer-in operation succeed, and the transaction is completed.

According to another embodiment of the present invention, the electronic cash transfer process can be divided into three sub-processes executed sequentially: i.e. the initialization, the transfer and the transaction confirmation. The detailed description of these sub-processes is given in the following.

Initialization Sub-Process

Figure 2:
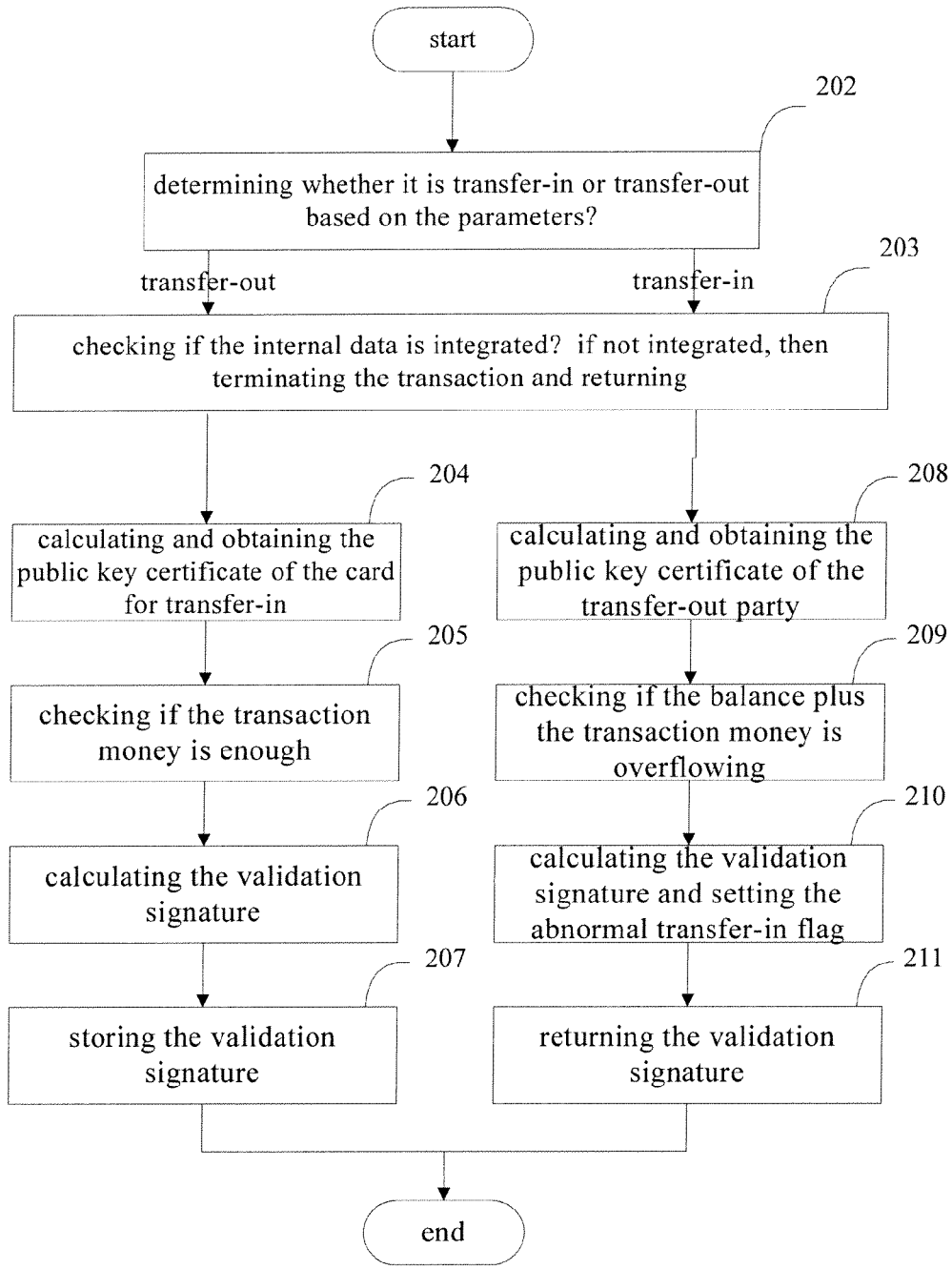
FIG. 2 illustrates an initializing procedure of the electronic cash transfer method according to one embodiment of the present invention.

As illustrated in FIG. 2, at step 202, either transfer-in or transfer-out is determined based on the parameters firstly. Then, at step 203, checking if the internal data written into the card is integrated, if not integrated, then terminating the transaction and returning the error information, or else continuing to execute the successive step 204 or 208.

At step 204, for the card for transfer-out, the public key certificate of the card for transfer-in is calculated and obtained by the card for transfer-out, and if it is acquired successfully, then the step 205 is entered, or else the transaction is exited. At step 205, the card for transfer-out checks if the transaction money is enough, if it is enough, then the step 206 is entered, or else the transaction exited. In step 206, the card for transfer-out calculates the digital signature of INDOL. Then, in step 207, the card for transfer-out stores the digital signature and returns the code 9000 to the terminal, to indicate that the initialization is completed.

In step 208, for the card for transfer-in, the card for transfer-in calculates and acquires the public key certificate of the card for transfer-out, and if it is acquired successfully, then the step 209 is entered, or else the transaction is exited. In step 209, the card for transfer-in checks if the balance plus the transaction money is overflowing, if it is overflowing, then the transaction is exited, or else the step 210 is entered. In step 210, the card for transfer-in calculates the digital signature of OUTADOL and sets the abnormal transfer-in flag in the card. Then, in step 211, the card for transfer-in returns the calculated digital signature together with code 9000 to the terminal to indicate that the initialization is completed.

In above initialization sub-process, IC card can decrypts the other side's card-issuing bank public key certificate using the internally stored certificate authorization (CA) public key certificate. Then, using the obtained card-issuing bank public key certificate, the other side's IC card public key certificate is decrypted.

It should be noted that the initialization sub-process of the card for transfer-out and the card for transfer-in can be executed sequentially, and can also be seperately executed in parallel, all these modifications fall in the scope defined by the appended claims.

After above initialization sub-process is completed, the transfer sub-process described in the following is entered.

Transfer Sub-Process

Figure 3:
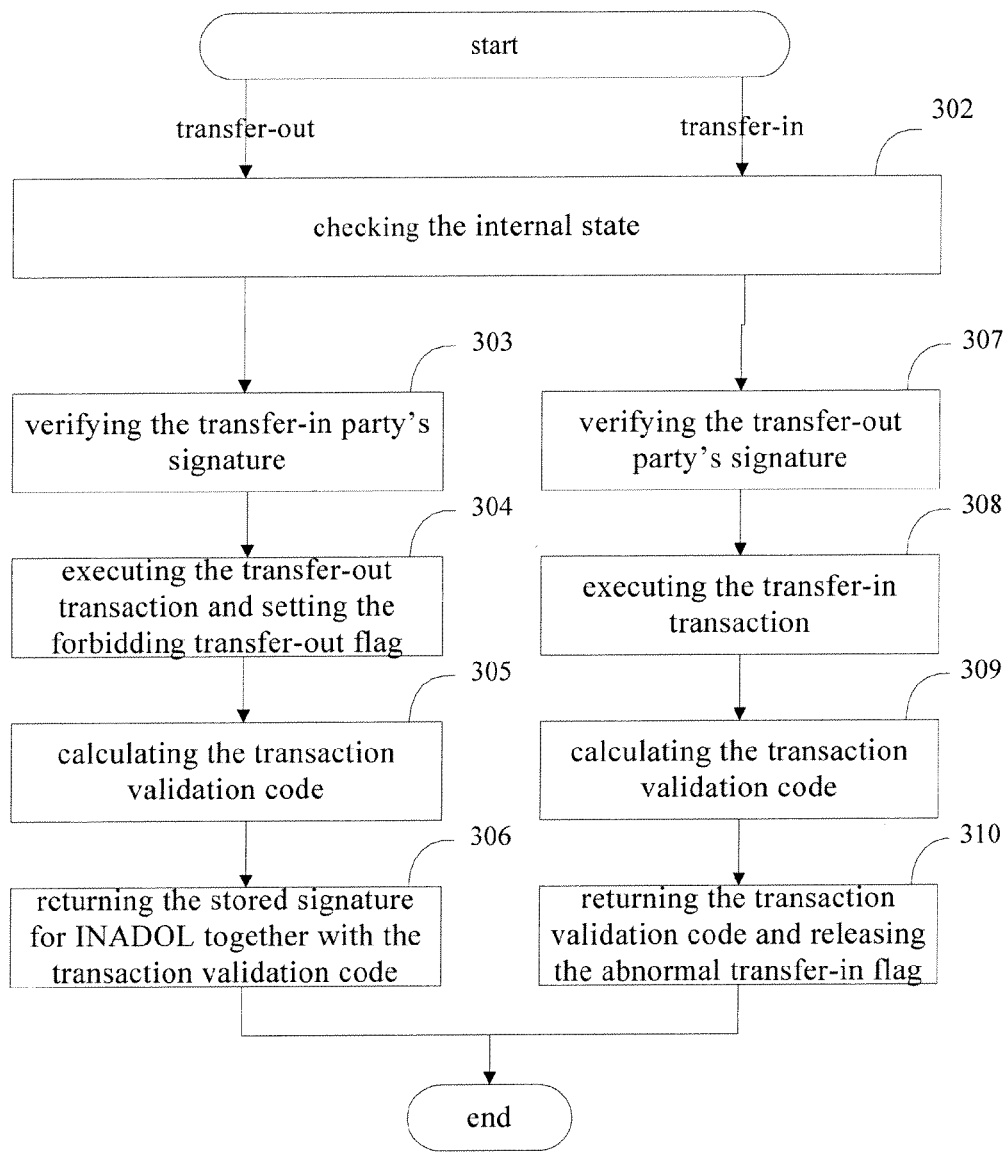
FIG. 3 illustrates a transferring procedure of the electronic cash transfer method according to one embodiment of the present invention.

As illustrated in FIG. 3, in step 302, the internal state of the card for transfer-out and the card for transfer-in is checked firstly, the so-called "internal state" refers to an internal flag which should be maintained based on the step involved in the transfer transaction, regardless of transfer-out party or transfer-in party, i.e. the previous associated necessary steps have been completed when some one step will be executed. If the check is passed, then steps 303 and 307 are entered.

In step 303, for the card for transfer-out, the card for transfer-out verifies the transfer-in party's digital signature for OUTADOL, and if the verification is passed, then step 304 is entered, or else the transaction is exited. In step 304, the card for transfer-out executes the transfer-out transaction operation. The transfer-out transaction operation comprises the deducting operation of the balance, recording the transaction detail in the card for transfer-out and setting the forbidding transfer-out flag. Then, step 305 is entered, the card for transfer-out calculates the first transaction validation code based on the INCDOL. At last, in step 306, the card for transfer-out returns the digital signature for INADOL previously calculated in step 206 together with the first transaction validation code calculated in step 305 to the terminal.

In step 307, for the card for transfer-in, the transfer-out party's digital signature for the INADOL is verified by the card for transfer-in, and if the verification is passed, then the step 308 is entered, or else the transaction is exited. In step 308, the card for transfer-out executes the transfer-in transaction operation. The transfer-in transaction operation comprises the adding operation for the balance, and recording the transaction detail in the card for transfer-in. Then, step 309 is entered, the card for transfer-in calculates the second transaction validation code based on DECDOL. At last, in step 310, the card for transfer-in returns the second transaction validation code to the terminal and releases the abnormal transfer-in flag in the card for transfer-in.

Thus, the transfer sub-process is completed and the transactions confirmation sub-process described in the following will be entered.

In above steps 305 and 309, the first transaction validation code and the second transaction validation code can be calculated by using the symmetric cryptographic-key.

Transaction Confirmation Sub-Process

Figure 4:
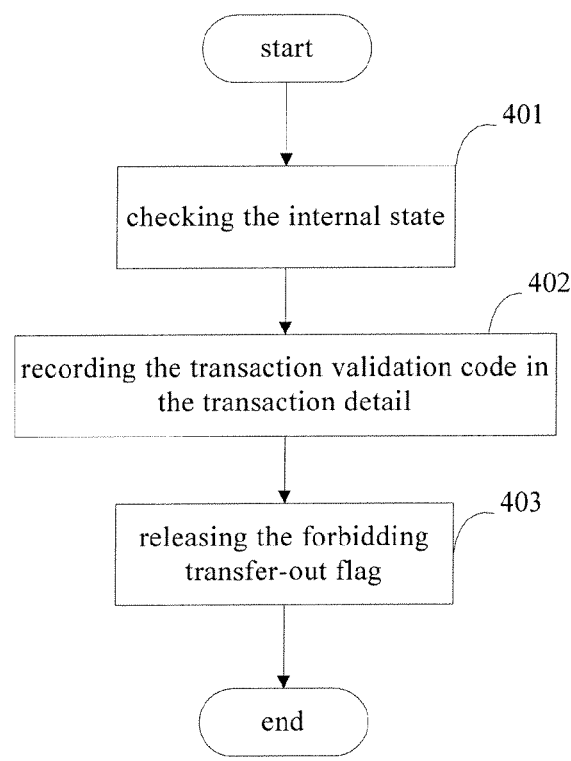
FIG. 4 illustrates a transaction confirming procedure of the electronic cash transfer method according to one embodiment of the present invention.

As illustrated in FIG. 4, in step 402, the card for transfer-out firstly checks the internal state, and if the check is passed, then the step 403 is entered, or else the transaction procedure is terminated. In step 403, the card for transfer-out records the first and the second transaction validation code in the transaction detail. At last, in step 404, the card for transfer-out release the forbidding transfer-out flag. Once the forbidding transfer-out flag is released, the card can continue to proceed the other transfer-out transaction.

In above embodiments of the present invention, instead of returning the validation signature for the card for transfer-in after the card to card transfer initialization is executed, the card for transfer-out retains the validation signature for the card for transfer-in until the transfer transaction has been completed, thus this can ensure that the transaction is completed only on the condition that the card for transfer-in is reliable, and that the card for transfer-out returns its signature for the transfer-in party validation data. In this way, if the terminal repeatedly sends the data to the card for transfer-in, then because the signature can not be validated, the data returned by the card for transfer-out can be used only once, thereby this can prevent that the terminal repeatedly transfers the money into the card for transfer-in by using the card for transfer-out.

In addition, because the public key certificate of CA is stored in the card instead of in the terminal, thus the certificate on the false card for transfer-out (transfer-in) and the certificate on the true card for transfer-out (transfer-in) can not "understand" each other, thereby this leads to the result that the transaction cannot proceed, and the fraud of the card is prevented.

At last, by setting the forbidding transfer-out flag and the abnormal transfer-in flag in the card, the following conditions can be avoided: i.e. the card for transfer-out has performed the transfers-out operation, while the card for transfer-in does not perform the transfer-in operation.

It should be noted that the terminal mentioned in the embodiments of the present invention should be understood as all kinds of computing device that can realize the function of above electronic cash transfer process, including but not limited to POS machine, ATM terminal and non-financial terminals; in addition, the card for transfer-in, the card for transfer-out, the cards and the card described here refer to a physical entity that can store electronic information, including but not limited to IC card and U disk and so on.

Figure 5:
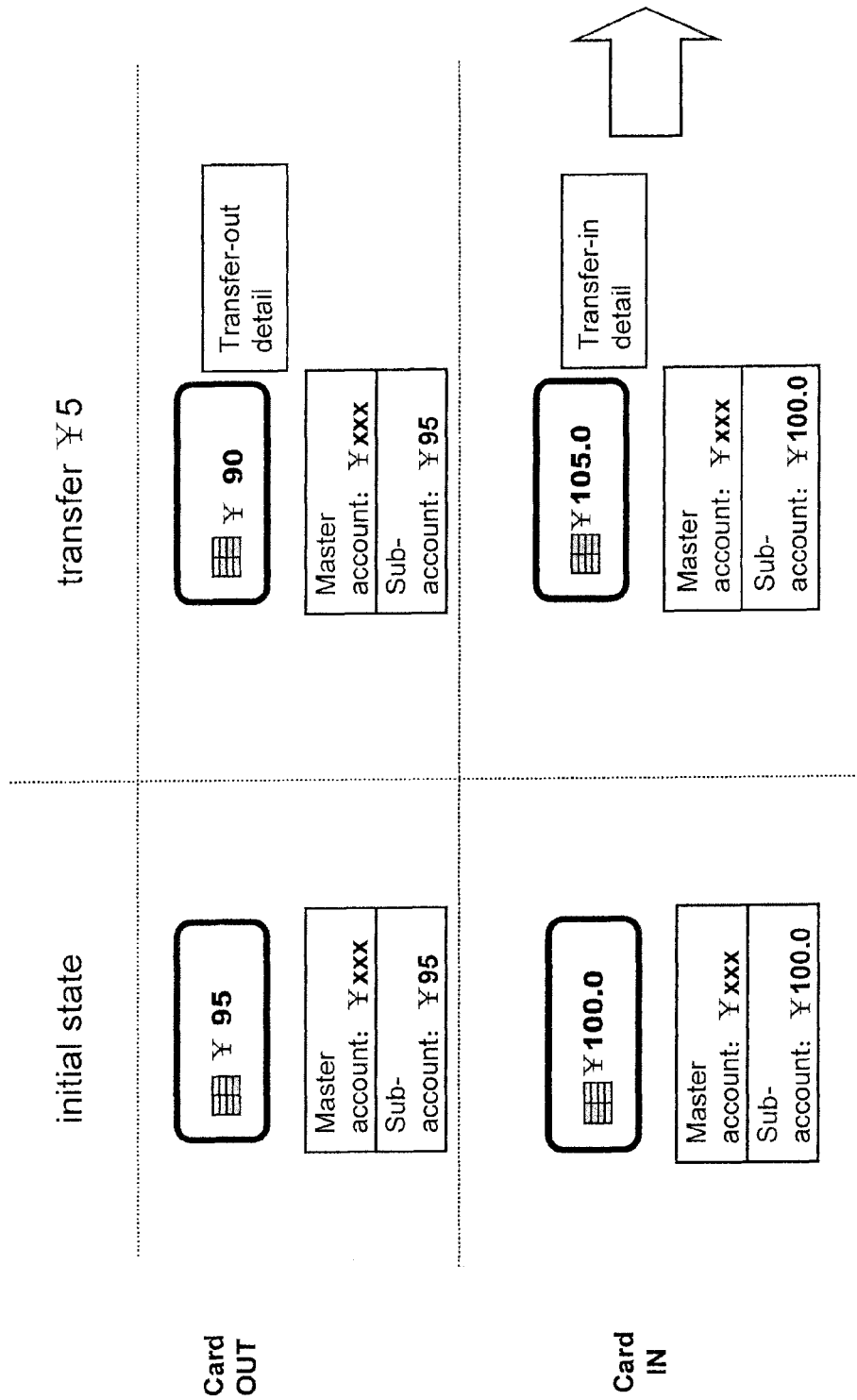
FIG. 5 illustrates an example for realizing the electronic cash transfer using the method of the present invention.

FIG. 5 illustrates an example for realizing the electronic cash transfer according to the method of the present invention. In FIG. 5, the card OUT is the card for transfer-out, in the initial state, there is ¥95 in it. The card IN is the card for transfer-in, there is ¥100 in it. After above card to card transfer process, the card OUT is deducted by ¥5, and the deducted money is transferred into the card IN, thus the money in the card IN becomes ¥105.

Figure 6:
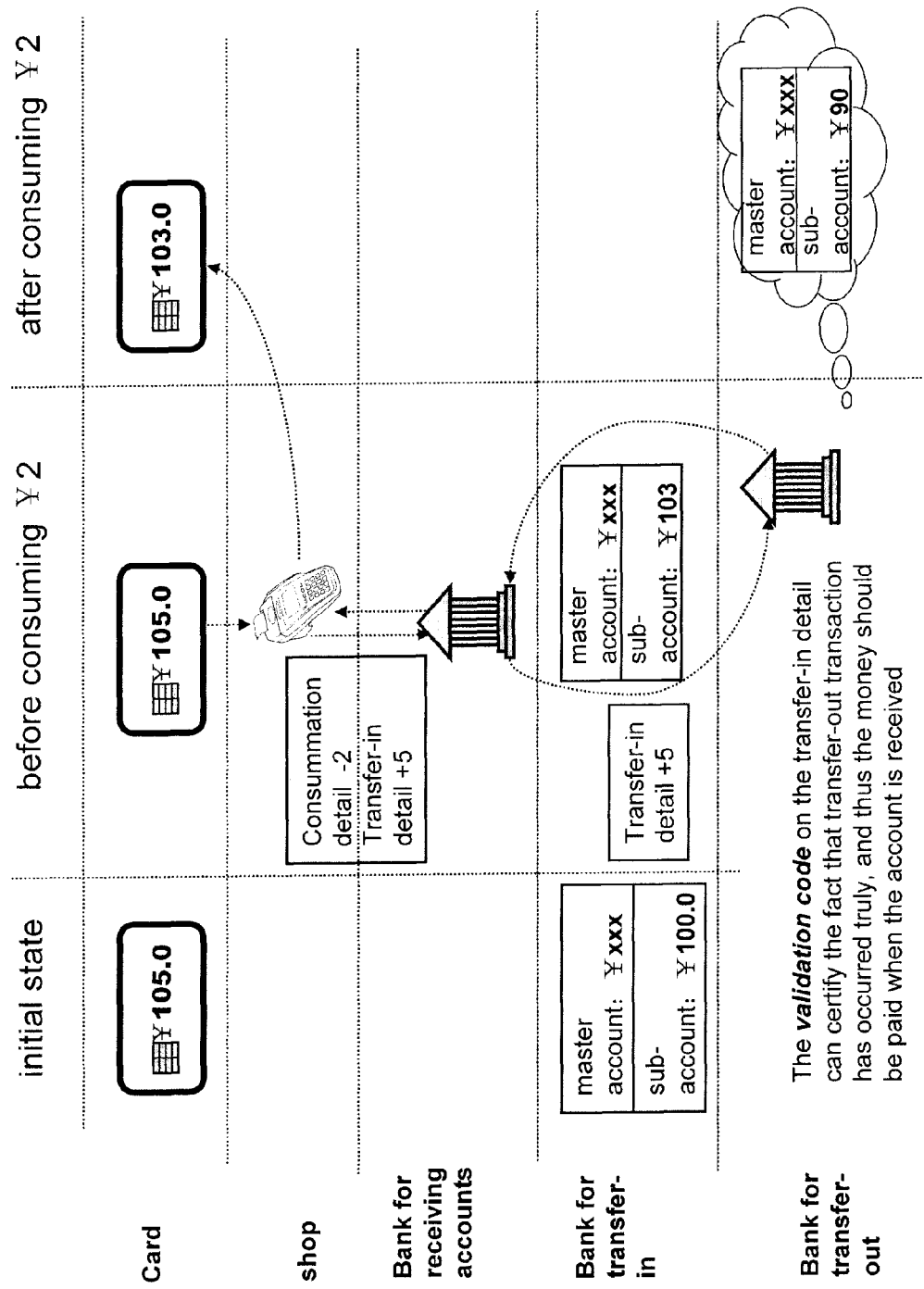
FIG. 6 illustrates the transfer-in flow of the electronic cash card when the consumption transaction is proceeded.

FIG. 6 illustrates the transfer-in flow of the electronic cash card illustrated in FIG. 5 for the consumption transaction after the electronic cash transfer is completed by the electronic cash card. The card IN with ¥105 consumes ¥2 in shop. When the card IN is deducted by ¥2 by the shop, the transfer between the card IN and the card OUT enter an item in the accounts of the card-issuing banks respectively, for the bank for transfer-in, the money in the card IN account is ¥100 plus ¥5 minus ¥2, namely is ¥103. For the bank for transfer-out, the money in the card OUT account is ¥90. That is, when the card to card transfer consumption about the card for transfer-in or the card for transfer-out has been proceeded, the transfer transaction enters an item in the accounts of the card-issuing banks.

The invention claimed is:

1. A data processing method of electronic cash transfer transaction, characterized in that said method comprises the following steps:
   a card for transfer-out generates a first digital signature based on the information provided by a card for transfer-in, and the card for transfer-in generates a second digital signature based on the information provided by the card for transfer-out and sends the second digital signature to the card for transfer-out via a terminal;
   the card for transfer-out verifies the second digital signature, and executes a transfer-out operation if it is right;
   the card for transfer-out generates a first transaction validation code associated with the card for transfer-in and sends the first digital signature and the first transaction validation code to the card for transfer-in via the terminal;
   the card for transfer-in verifies the first digital signature, and executes a transfer-in operation if it is right; and
   the card for transfer-in generates a second transaction validation code associated with the card for transfer-out and sends the second transaction validation code to the card for transfer-out via the terminal, to confirm that the transfer transaction is successful;
   wherein the card for transfer-out and the card for transfer-in verifies the second and the first digital signature by using the public key certificate of the card for transfer-in and the public key certificate of the card for transfer-out respectively, and wherein the card for transfer-out obtains the public key certificate of the card for transfer-in according to the following steps:
   obtaining a card-issuing bank public key certificate of the card for transfer-in based on the CA public key certificate internally stored in the card for transfer-out; and
   obtaining the public key certificate of the card for transfer-in by using the obtained card-issuing bank public key certificate of the card for transfer-in.

2. The method according to claim 1, wherein the card for transfer-out generates the first digital signature according to the following steps: the card for transfer-out obtains a public key certificate of the card for transfer-in, and if it is successful, then further determines if the balance in the card for transfer-out meets the requirement of the transfer transaction, and if it meets, then based on a transfer-in party validation list provided by the card for transfer-in, generates the first digital signature by using the private key certificate of the card for transfer-out, said transfer-in party validation list comprises the balance of the card for transfer-out and a transfer-in counter.

3. The method according to claim 2, wherein the private key certificates of the card for transfer-out and the card for transfer-in are stored in the card for transfer-out and the card for transfer-in respectively.

4. The method according to claim 2, wherein the card for transfer-out executes the transfer-out operation according to the following steps:
   deducting the transfer money from the balance in the card for transfer-out;
   recording the transaction detail in the card for transfer-out; and
   setting the forbidding transfer-out flag of the card for transfer-out.

5. The method according to claim 4, further comprises the following steps:
   the card for transfer-out receives the second transaction validation code; and
   the forbidding transfer-out flag of the card for transfer-out is released.

6. The method according to claim 1, wherein the card for transfer-in generates the second digital signature according to the following steps: the card for transfer-in obtains a public key certificate of the card for transfer-out, and if it is successful, then further determines if the balance in the card for transfer-in meets the requirement of the transfer transaction, and if it meets, then based on a transfer-out party validation list provided by the transfer-out card, generates the second digital signature by using the private key certificate of the card for transfer-in, and sets the abnormal transfer-in flag of the card for transfer-in, said transfer-out party validation list comprises a transfer-out counter.

7. The method according to claim 6, wherein the private key certificates of the card for transfer-out and the card for transfer-in are stored in the card for transfer-out and the card for transfer-in respectively.

8. The method according to claim 6, wherein the card for transfer-in executes the transfer-in operation according to the following steps:
   summing the transfer money and the balance in the card for transfer-in;
   recording the transaction detail in the card for transfer-in; and
   releasing the abnormal transfer-in flag of the card for transfer-in.

9. The method according to claim 1, wherein the card for transfer-out obtains the public key certificate of the card for transfer-in according to the following steps:
   obtaining a card-issuing bank public key certificate of the card for transfer-in based on the CA public key certificate internally stored in the card for transfer-out; and
   obtaining the public key certificate of the card for transfer-in by using the obtained card-issuing bank public key certificate of the card for transfer-in.

10. The method according to claim 1, wherein the information provided by the card for transfer-in and the card for transfer-out is sent to the card for transfer-out and the card for transfer-in via the terminal.

11. The method according to claim 1, further comprises the following steps:
   when the card for transfer-out or the card for transfer-in consumes, the transfer transaction enters an item in the accounts of the card-issuing banks of the card for transfer-out and the card for transfer-in.

12. A data processing method of electronic cash transfer transaction, characterized in that said method comprises the following steps:
   a card for transfer-out generates a first digital signature based on the information provided by a card for transfer-in, and the card for transfer-in generates a second digital signature based on the information provided by the card for transfer-out and sends the second digital signature to the card for transfer-out via a terminal;
   the card for transfer-out verifies the second digital signature, and executes a transfer-out operation if it is right;
   the card for transfer-out generates a first transaction validation code associated with the card for transfer-in and sends the first digital signature and the first transaction validation code to the card for transfer-in via the terminal;

the card for transfer-in verifies the first digital signature, and executes a transfer-in operation if it is right; and the card for transfer-in generates a second transaction validation code associated with the card for transfer-out and sends the second transaction validation code to the card for transfer-out via the terminal, to confirm that the transfer transaction is successful;

wherein the card for transfer-out and the card for transfer-in verifies the second and the first digital signature by using the public key certificate of the card for transfer-in and the public key certificate of the card for transfer-out respectively and wherein the card for transfer-in obtains the public key certificate of the card for transfer-in according to the following steps:

obtaining a card-issuing bank public key certificate of the card for transfer-out based on the CA public key certificate internally stored in the card for transfer-in; and obtaining the public key certificate of the card for transfer-out by using the obtained card-issuing bank public key certificate of the card for transfer-out.

13. A data processing method of electronic cash transfer transaction, characterized in that said method comprises the following steps:

a card for transfer-out generates a first digital signature based on the information provided by a card for transfer-in, and the card for transfer-in generates a second digital signature based on the information provided by the card for transfer-out and sends the second digital signature to the card for transfer-out via a terminal;

the card for transfer-out verifies the second digital signature, and executes a transfer-out operation if it is right;

the card for transfer-out generates a first transaction validation code associated with the card for transfer-in and sends the first digital signature and the first transaction validation code to the card for transfer-in via the terminal;

the card for transfer-in verifies the first digital signature, and executes a transfer-in operation if it is right; and the card for transfer-in generates a second transaction validation code associated with the card for transfer-out and sends the second transaction validation code to the card for transfer-out via the terminal, to confirm that the transfer transaction is successful, wherein the card for transfer-out generates the first transaction validation code according to the following steps: based on a value-added digital signature list provided by the card for transfer-in, generating the first transaction validation code by using the symmetric key algorithm, wherein the card for transfer-in generates the second transaction validation code according to the following steps: based on a value-reduced digital signature list provided by the card for transfer-out, generating the second transaction validation code by using the symmetric key algorithm.

* * * * *